United States Patent [19]

Lang

[11] Patent Number: 4,943,070
[45] Date of Patent: Jul. 24, 1990

[54] SEALING SYSTEM FOR DIAPHRAGM TYPE VULCANIZING PROCESS

[75] Inventor: Aage Lang, Kolind, Denmark

[73] Assignee: Milliken Denmark A/S, Morke, Denmark

[21] Appl. No.: 257,065

[22] Filed: Oct. 13, 1988

[30] Foreign Application Priority Data

Jun. 30, 1988 [DK] Denmark .............................. 3639/88

[51] Int. Cl.⁵ .............................................. F16J 15/12
[52] U.S. Cl. .................... 277/235 R; 285/910; 425/389
[58] Field of Search .......... 277/235 R, 101.12, 188 A, 277/188 R; 425/389, 390; 285/910, 368

[56] References Cited

U.S. PATENT DOCUMENTS

| | | | |
|---|---|---|---|
| 1,984,806 | 12/1934 | Pfefferle | 277/235 R |
| 2,366,161 | 1/1945 | Tweedale | 277/235 R |
| 2,385,544 | 9/1945 | Salisbury | 425/389 |
| 2,402,868 | 6/1946 | Boyle | 285/368 X |
| 2,895,168 | 7/1959 | Sabo | 425/389 |
| 2,962,757 | 12/1960 | Slemmons et al. | 425/389 X |
| 3,398,978 | 8/1968 | Gasche | 285/368 X |
| 3,520,543 | 7/1970 | Etter et al. | 277/235 R |
| 4,030,517 | 6/1977 | Pyle | 137/614.14 X |
| 4,658,618 | 4/1987 | Hellgren | 425/389 X |

FOREIGN PATENT DOCUMENTS 1553550 2/1968 France .................... 277/188 A

Primary Examiner—Allan N. Shoap
Attorney, Agent, or Firm—Earle R. Marden; H. William Petry

[57] ABSTRACT

In a sealing system for a diaphragm type vulcanizing press, the diaphragm (19), having a roundgoing fixing flange, applies the necessary compression moulding pressure during the vulcanizing press operation, and along its edge the diaphragm is attached to a fixing flange (10) on one of the press parts through a number of fixing devices mounted round along the diaphragm (19) edge, fixing a roundgoing frame (12) against the diaphragm (19) for the sealing of same against the press fixing flange (10). In that between frame (12) and the press fixing flange (10) along the diaphragm (19) flange edge and within the various fixing devices, a compression unit (14, 16) running round along these of a constant cross section shape to form a local and narrow compression zone (18) running round along the number of fixing units in the diaphragm flange material, good sealing is achieved with even large diaphragm areas between the fixing flange and the diaphragm at low assembly power viewed in relation to the maximum print medium pressure prevailing behind the diaphragm (19).

5 Claims, 1 Drawing Sheet

FIG. -1-
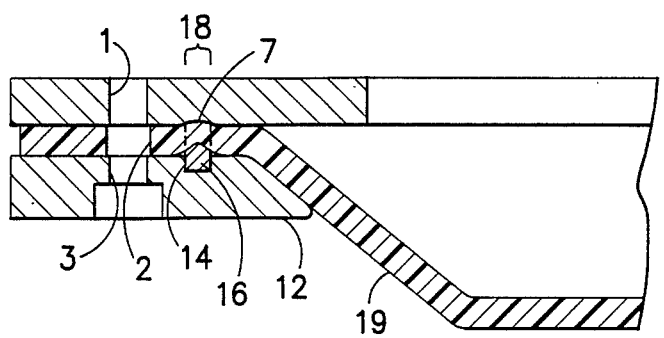
FIG. -2-
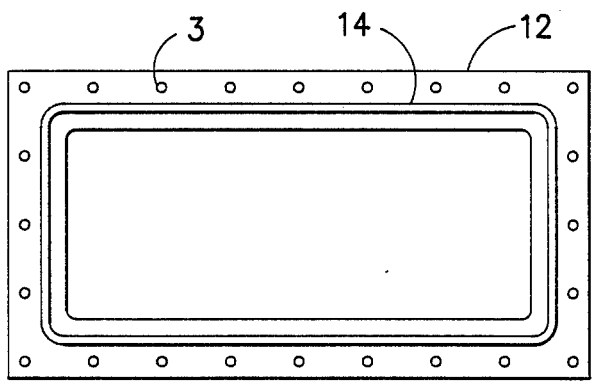
FIG. -3-
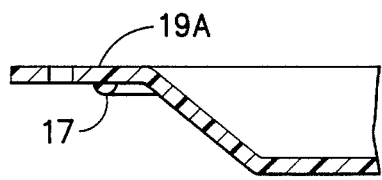
FIG. -4-
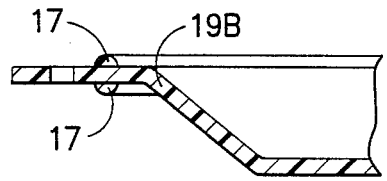
FIG. -5-

SEALING SYSTEM FOR DIAPHRAGM TYPE VULCANIZING PROCESS

This invention concerns a sealing system for a diaphragm type vulcanizing press in which the diaphragm having an encircling fixing flange applies the necessary compression moulding pressure during the vulcanizing press operation. The diaphragm is attached along its edge to a fixing flange on one of the press parts through a number of fixing devices mounted around the diaphragm edge, fixing an encircling frame against the diaphragm for sealing of same against the press fixing flange. In such sealing systems, it has so far been difficult to get, without using excessive fixing power in the fixing devices, complete tightness between the diaphragm flange and said fixing flange. This is probably due to the long circumference of the diaphragm and small thickness variations in the diaphragm.

It is the purpose of this invention to provide a sealing system remedying said drawbacks and bringing about effective sealing without using sealing adhesives, thus simplifying the replacement of the diaphragm greatly.

This is achieved according to the invention through a sealing system characteristic in that between said frame and the press fixing flange along the diaphragm flange edge and within the number of fixing devices, a compression unit has been placed running round along these and being of constant cross section shape to form a local and narrow compression zone, running round along the number of fixing devices, in the diaphragm material. This has proven to provide effective sealing without particularly high fixing Power in the fixing devices, the number of which could also be reduced for a particular diaphragm size without reducing the sealing effectiveness.

In one embodiment, the compression unit is a local and narrow wall thickness increase worked out in the diaphragm flange material itself.

In another embodiment, this wall thickness increase may be a strand of material attached to the diaphragm flange.

In yet another embodiment, the compression unit is an endless groove of constant cross section in the press fixing flange and a strand embedded in the groove of a constant cross section appropriate for this, of a height higher than the depth of the groove.

In yet another embodiment, the compression unit is an endless groove of constant cross section in the fixing frame, and a strand embedded in this of a constant cross section suitable for this of a height higher than the depth of the groove.

Said strand is preferably of steel and has a convex part of its cross section bearing against the diaphragm flange.

Below, this invention will be further explained in relation to some embodiments and with reference to the drawing where FIG. 1 shows a diaphragm for a vulcanizing press of the diaphragm type bearing against the press fixing flange together with a roundgoing frame, FIG. 2 shows a section along II—II in FIG. 1, FIG. 3 shows a plane view of the frame with endless groove shown in FIG. 2, FIG. 4 shows a section through a diaphragm of another flange shape, and FIG. 5 shows a section through the edge flange of a diaphragm of a third embodiment.

From a side view, FIG. 1 shows a vulcanizing press fixing flange 10 to which a vulcanizing press diaphragm 19 may be fixed using a roundgoing frame 12 to the fixing flange by fixing units not shown.

FIG. 2 shows on a larger scale a section along II—II in FIG. 1. It also appears that the diaphragm 19 has a flange of constant thickness which is locally deformed in a narrow area 18 by a steel or similar hard material strand 16 or similar embedded in a key groove 14. The fixing units not shown have been conducted through the openings 1, 2, and 3 in the fixing flange 10, the diaphragm 19, and the frame 12, respectively.

FIG. 3 shows the frame 12 with the endless roundgoing groove 14 for embedding of a strand 16 the cross section of which is higher than the groove 14 depth, and where the strand material is at least as hard as the diaphragm 19 material. The strand may, however, be softer than the diaphragm 19 material but should then have an even bigger difference between the strand 16 cross section height and the groove 14 depth. In a preferable embodiment, the strand 16 is of steel with a rounded part bearing against the diaphragm 19 for local compression of same in a narrow compression zone 18.

FIGS. 4 and 5 show another two embodiments to be used for the sealing system to the invention where the diaphragm 19A or 19B has one or two opposite rounded projections 17 placed round along the diaphragm flange within the bolt holes, which projections may be adhered or vulcanized to the diaphragm and are preferably of the same material as the diaphragm or at least of a material compatible with same. Thus, the groove with strand 16 embedded therein may be left out from the frame 12.

To achieve the purpose of the invention, at least one of the clamping parts constituted by the fixing flange 10 and the frame 12 may be provided with a rounded indentation 7, as shown in FIG. 2. This indentation runs along the entire compression 18 extent, is rounded as shown, and has a constant cross section shape.

This will cause the diaphragm to form, in the case shown in FIG. 2, a funnel in the compression zone 18 while at the same time a certain compression of the diaphragm 19 flange material is retained because the indentation 7 depth is less than the height by which the strand 16 protrudes from the key groove 14.

In the cases shown in FIGS. 4 and 5, the indentation 7 causes the local compression zone 18 to be retained because the indentation 7 height is less than the material strand 17 height.

In all cases, the indentation 7 causes the diaphragm 19 flange to tend less to slide out of the engagement between clamping parts 10, 12 because the indentation 7 increases the resistance against this.

I claim:

1. Sealing system for a vulcanizing press of the diaphragm type comprising: a diaphragm, a first flange member on one side of said diaphragm encompassing the perimeter thereof, a second flange member on the other side of said diaphragm encompassing the perimeter thereof and being operably associated with said first flange member, an indention in and around the interior side of one of said flange members facing said diaphragm member and means operably associated with said diaphragm member to force a portion of said diaphragm into said indentation when said flange members are pressed together to hold said diaphragm therebetween, said means including an endless groove in the inside of said flange member facing the flange member having said indentation therein and a strand of material of constant cross section in said groove having a height higher than the depth of said groove.

2. The system of claim 1 wherein the height of the strand of material above the groove is greater than the depth of said indentation.

3. Sealing system for a vulcanizing press of the diaphragm type comprising: a diaphragm, a first flange member on one side of said diaphragm encompassing the perimeter thereof, a second flange member on the other side of said diaphragm encompassing the perimeter thereof and being operably associated with said first flange member, an indention in and around the interior side of one of said flange members facing said diaphragm member and means operably associated with said diaphragm member to force a portion of said diaphragm into said indentation when said flange members are pressed together to hold said diaphragm therebetween, said means including a first ridge of material projecting outwardly therefrom and connected to said diaphragm.

4. The system of claim 3 wherein said first ridge of material has a height greater than the depth of said indentation.

5. The system of claim 4 wherein said first ridge of material is an integral part of said diaphragm.

* * * * *